United States Patent
Iwamura et al.

(10) Patent No.: US 7,571,323 B2
(45) Date of Patent: Aug. 4, 2009

(54) IMAGE PROCESSOR, METHOD THEREOF, COMPUTER PROGRAM, AND COMPUTER READABLE STORAGE MEDIUM

(75) Inventors: Keiichi Iwamura, Ohta-ku (JP); Kitahiro Kaneda, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 875 days.

(21) Appl. No.: 10/759,364

(22) Filed: Jan. 16, 2004

(65) Prior Publication Data

US 2004/0148507 A1    Jul. 29, 2004

(30) Foreign Application Priority Data

Jan. 22, 2003  (JP) .............. 2003-013737

(51) Int. Cl.
*H04L 9/00* (2006.01)
*G06K 9/00* (2006.01)
(52) U.S. Cl. ..................................... 713/176
(58) Field of Classification Search ................. 713/176; 382/100
See application file for complete search history.

(56) References Cited

U.S. PATENT DOCUMENTS

| | | | |
|---|---|---|---|
| 4,227,719 A | 10/1980 | McElligott | |
| 5,074,596 A | 12/1991 | Castagnoli | |
| 5,636,292 A | 6/1997 | Rhoads | |
| 5,761,686 A * | 6/1998 | Bloomberg | .................. 715/529 |
| 5,861,619 A | 1/1999 | Horino | |
| 6,285,776 B1 | 9/2001 | Rhoads | |
| 2003/0179412 A1* | 9/2003 | Matsunoshita | ............. 358/3.28 |

FOREIGN PATENT DOCUMENTS

| | | |
|---|---|---|
| CN | 1045069 | 9/1990 |
| JP | 7-058950 A | 3/1995 |
| JP | 7-115537 A | 5/1995 |
| JP | 11-119651 A | 4/1999 |
| JP | 2001-324898 A | 11/2001 |
| JP | 2001-346042 | 12/2001 |
| JP | 2002-368983 A | 12/2002 |
| JP | 2003-008877 A | 1/2003 |

\* cited by examiner

*Primary Examiner*—Kambiz Zand
*Assistant Examiner*—Aubrey H Wyszynski (57) ABSTRACT

A method for image processing comprising inputting and reading a combined image that includes a latent image unperceivable by the human eye, a patterned image in the background allowing the latent image to appear clearly on a recording medium when data recorded on a recording medium is copied onto another recording medium, and text and/or image data embedded with a digital watermark. The text and/or image data is extracted from the combined image and the digital watermark extracted from the text and/or image data. A permission code enabling copying of image data composed of a combination of a patterned image and the extracted text and/or image data onto a recording medium is input. The copying is regulated based on the extracted digital watermark and the permission code.

8 Claims, 7 Drawing Sheets

IMAGE PROCESSOR, METHOD THEREOF, COMPUTER PROGRAM, AND COMPUTER READABLE STORAGE MEDIUM

BACKGROUND OF THE INVENTION

1. Field of the Invention

The present invention relates to anti-counterfeit technology of printed material.

2. Description of the Related Art

Recent improvement in the image quality of copiers has enabled the production of color copies with small degradation in image quality compared to the original document. Consequently, documents such as monetary instruments, identification documents, or important documents have been forged by using such copiers. Therefore, the need for technology to counteract forgery of printed documents has increased.

To serve this need, technology for hiding a latent image, such as a VOID pattern, in an image of a printed document by utilizing the coarseness and fineness of the pattern of the image and for making the latent image appear when the printed document is color copied has been developed. (For example, refer to U.S. Pat. No. 4,227,719.) This technology cannot control the copying process, for instance, by inhibiting the production of copies. The technology, however, has a deterrent effect on forgery by making a VOID pattern appear in the copied image, thus indicating that the copied image is not an original. In the following, such an image of a printed document including a latent image that appears when the printed document is copied is referred to as a 'patterned image.'

Even when a legitimate user (e.g., the owner of the original image) copies the original document including a patterned image, a latent image appears, and so the appearance of the copied image differs from the appearance of the original. This can be an advantage from the aspect of anti-counterfeiting of printed materials. This, however, is also a disadvantage in that the copying of the printed material cannot be precisely controlled. For recent copyright protection and document control systems, a system for granting legitimate users with various permissions for using certain images or documents by verifying the user's ownership or payment of a registration fee and for rejecting non-legitimate users is required. Unfortunately, the known technology based on patterned images does not meet this requirement.

At the same time, digital watermarks have recently gained attention for protecting copyrights. Digital watermarking is a technology for hiding a watermark in digital data such as images, sounds, or documents in a way unperceivable to humans. For example, there are various methods for known digital watermark technologies applied to multi-valued images utilizing the redundancy of the multi-valued pixel intensity. Another example of a method for known digital watermark technology is a method for imbedding a digital watermark in the spatial domain, known as a patchwork (for instance, refer to U.S. Pat. No. 5,636,292). Another known method for imbedding a digital watermark in the frequency domain is discrete cosine transform.

Binary images such as document images have less redundancy compared to multi-valued images, and, thus, it is difficult to apply digital watermark technology. In spite of this difficulty, there are several known digital watermark methods utilizing the characteristics of document images (for instance, refer to U.S. Pat. No. 5,861,619).

SUMMARY OF THE INVENTION

By applying the various above-mentioned technologies of digital watermarking, any kind of data can be embedded in a document image. By embedding a permission code and then extracting the digital watermark with a copier to process this code, the conditions for copying may be precisely controlled. To implement such digital watermark technology, the copier is required to have extracting means for extracting the embedded digital watermark. Thus, if a user with malicious motives uses a regular copier without a digital watermark extracting function, the document image may easily be copied. Consequently, the objective of fully regulating the conditions of copying the document image cannot be achieved only by digital watermark technology. Furthermore, digital watermark technology cannot be applied to copies of the original document image. This fact results in the problem that once the original document image is copied, the conditions of copying the copied document image cannot be regulated.

An object of the present invention is to generate a text image that can only be copied exactly by a user who has been granted permission to produce copies.

Thus, one aspect of the present invention is a method for image processing comprising inputting and reading a combined image that includes a latent image unperceivable to the human eye, a patterned image in the background allowing the latent image to appear clearly on a recording medium when data recorded on a recording is copied onto another recording medium, and text and/or image data embedded with a digital watermark. The text/and or image data is extracted from the combined image and the digital watermark extracted from the text and/or image data. A permission code enabling copying of image data composed of a combination of a patterned image and the extracted text and/or image data onto a recording medium is input. The copying is regulated based on the extracted digital watermark and the permission code.

Other objects, features and advantages of the invention will become apparent from the following detailed description taken in conjunction with the accompanying drawings.

DESCRIPTION OF THE PREFERRED EMBODIMENTS

In the following, preferable embodiments according to the present invention are described in detailed by referring to the attached drawings.

First Embodiment

A first embodiment of the present invention includes a text image generator that generates a text image, where the text image includes text, an image, or both text and an image. The text image generator allows an authorized user (i.e., granted permission) to produce copies of the original text image. The first embodiment also includes a copier, which regulates the copying process by producing text images without clearly copying the latent image and by allowing only an authorized user (i.e., granted permission) to produce a copy.

Text Image Generator

Figure 1:
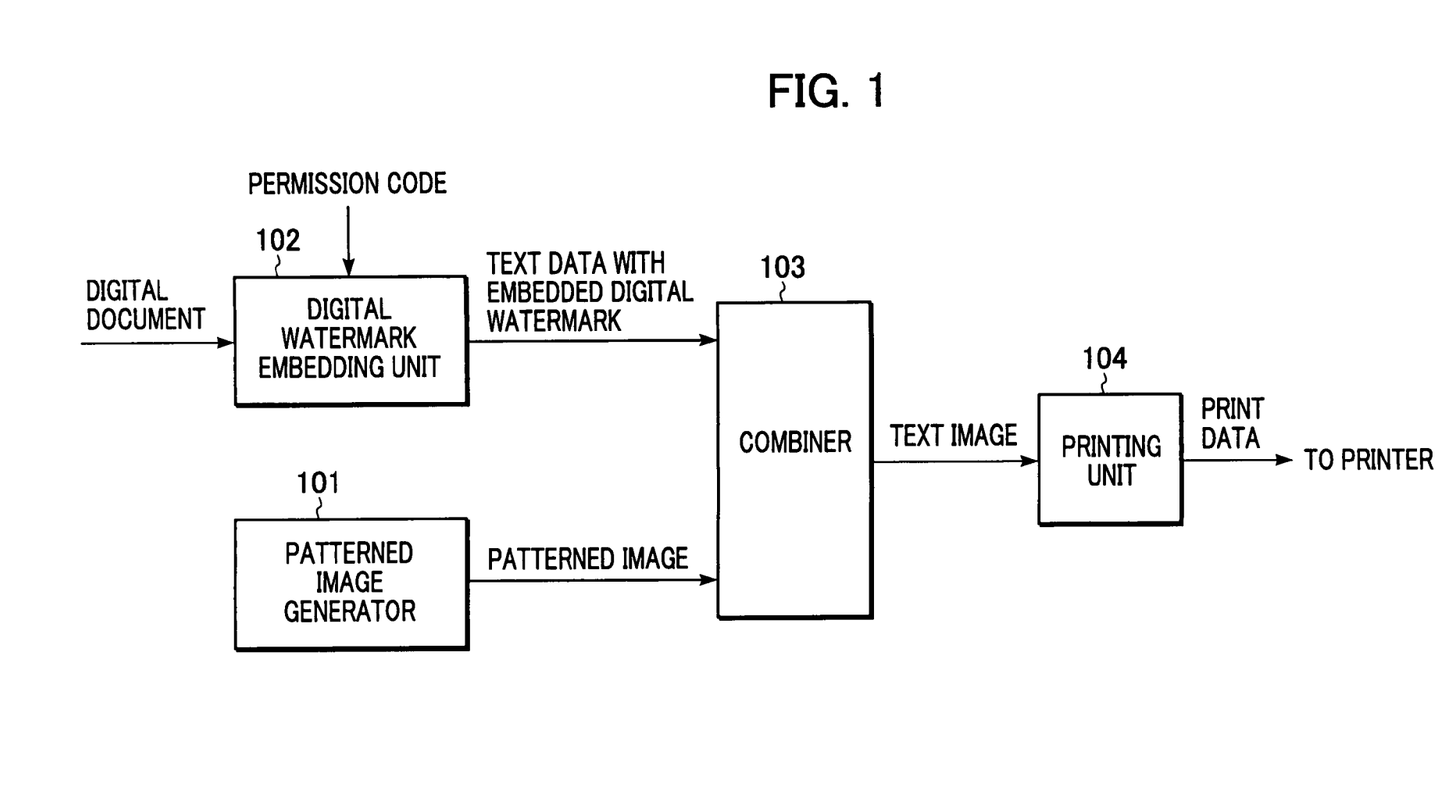
FIG. 1 is a block diagram showing the functional structure of a text image generator according to a first embodiment of the present invention.

FIG. 1 is a block diagram of the functional structure of the above-mentioned text image generator. Each unit shown in the drawing is implemented by software. The function of each unit is realized by executing software programs corresponding to each unit with a CPU (or a main controller such as an MPU) of a computer. The basic composition of the computer is described in the following.

A patterned image generator 101 generates patterned images including latent images, such as VOID patterns, unperceivable by the human eye. The production process of the patterned image is well known in the art, therefore, a description of the process is omitted. The patterned image may be generated in advance. In such case, the patterned image generator 101 will not generate a patterned image but, instead, functions to supply the patterned image prepared in advance to the combiner 103.

A digital watermark embedding unit 102 applies digital watermark technology for text by imbedding a permission code as a digital watermark in the text of a digital document for granting permission to copy the digital document. Digital watermark technology for text includes, for example, controlling the character spacing of the text or rotating characters in accordance with the imbedded information. Any type of digital watermark technology for text may be applied in the present invention. These technologies are already known, and, therefore, descriptions associated with these technologies are omitted.

The imbedded permission code may be a password known only by a legitimate user, an identification number for the digital document, a portion of the digital document that is allowed to be copied, or a copying fee. Theses conditions are predetermined and inputted by the author of the digital document.

The combiner 103 combines a patterned image provided by the patterned image generator 101 as a background image and text having an embedded digital watermark generated by the digital watermark embedding unit 102. The resultant combined text image is sent to a printing unit 104.

The printing unit 104 is, for example, a printer driver that converts the text image from the combiner 103 into print data and outputs this data to a printer.

Figure 2:
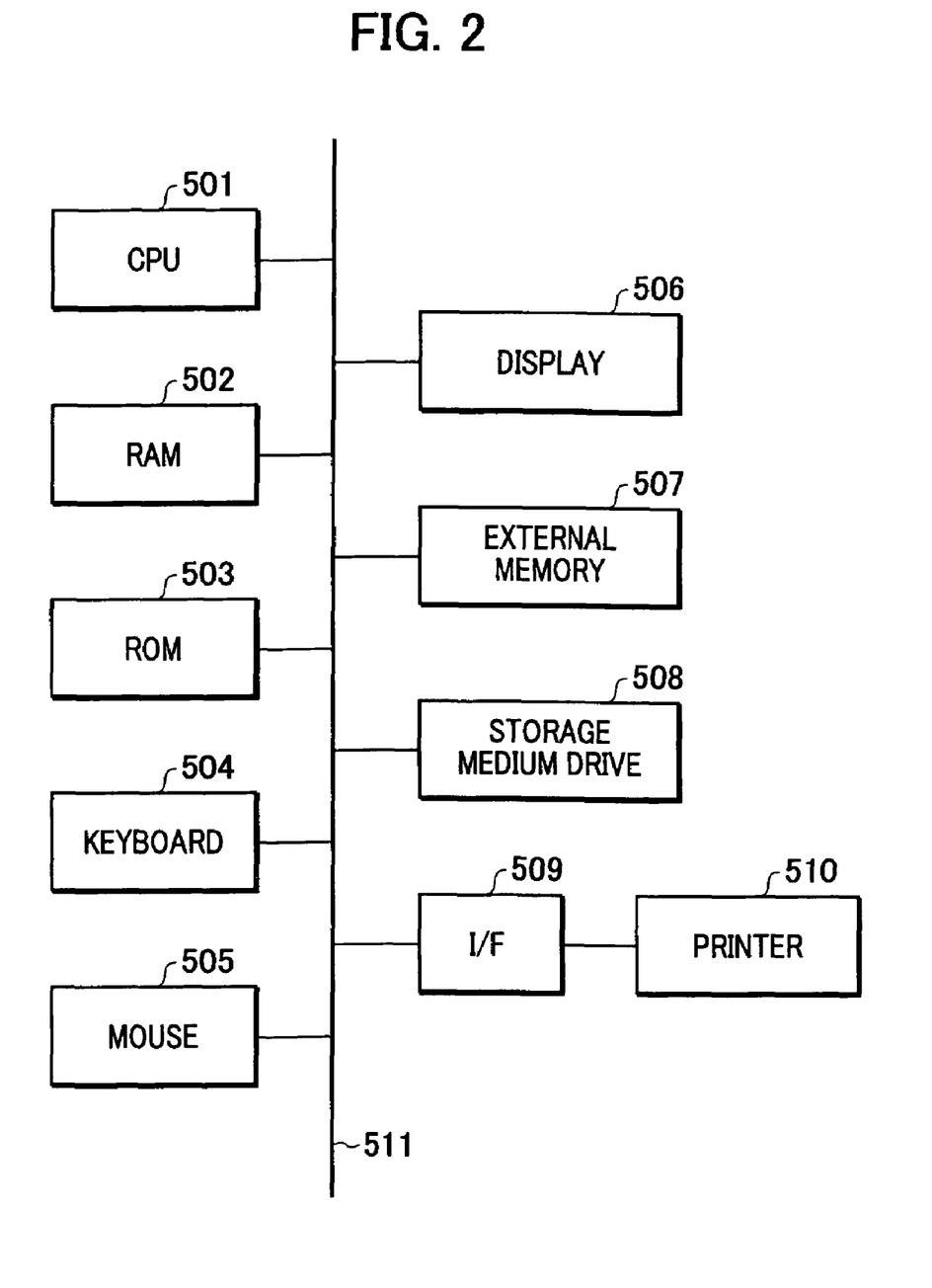
FIG. 2 is a drawing showing the basic composition of a computer for executing software programs corresponding to each unit and a printer, shown in FIG. 1.

FIG. 2 shows the basic structure of a computer executing software programs corresponding to each unit depicted in FIG. 1 and a printer (not shown) used in conjunction with the units of FIG. 1.

A CPU 501 controls the entire computer by utilizing programs and data stored in memories such as RAM 502 or ROM 503 and, at the same time, controls a series of processes related to text image generation. The RAM 502 has an area for temporarily storing programs and data loaded from an external memory 507 or a storage medium drive 508, and an area required by the CPU 501 to execute various processes.

The ROM 503, in general, stores programs and data for controlling the entire computer. A keyboard 504 and a mouse 505 are used for inputting various commands to the CPU 501. The user can input the above-mentioned permission code for the digital watermark through the keyboard 504 or the mouse 505.

A display 506 includes a CRT or a liquid crystal monitor, and displays the above-mentioned digital document, the patterned image, and the generated text image. An external memory 507 is typically a mass storage device such as a hard disk. The external memory 507 stores an operating system (OS) and individual software programs that function as the patterned image generator 101, the digital watermark embedding unit 102, the combiner 103, and the printing unit 104. When a patterned image is prepared in advance, the patterned image is stored in the external memory 507. Text data for the digital document are also stored in the external memory 507.

A storage medium drive 508 reads programs and data stored on a storage medium such as a CD-ROM or a DVD-ROM, and outputs the programs and data to the RAM 502 or the external memory 507. Alternatively, the programs and data stored in the external memory 507 may be partly or entirely stored on a storage medium and may be loaded into the RAM 502 as required.

The computer performs data communication with a printer 510, via an interface (I/F) 509. The printer 510 is an apparatus for forming images on a recording medium, such as paper or overhead projector (OHP) films, in accordance with the print data generated by the above-mentioned printing unit 104. A bus 511 connects each of the above-mentioned units.

Figure 3:
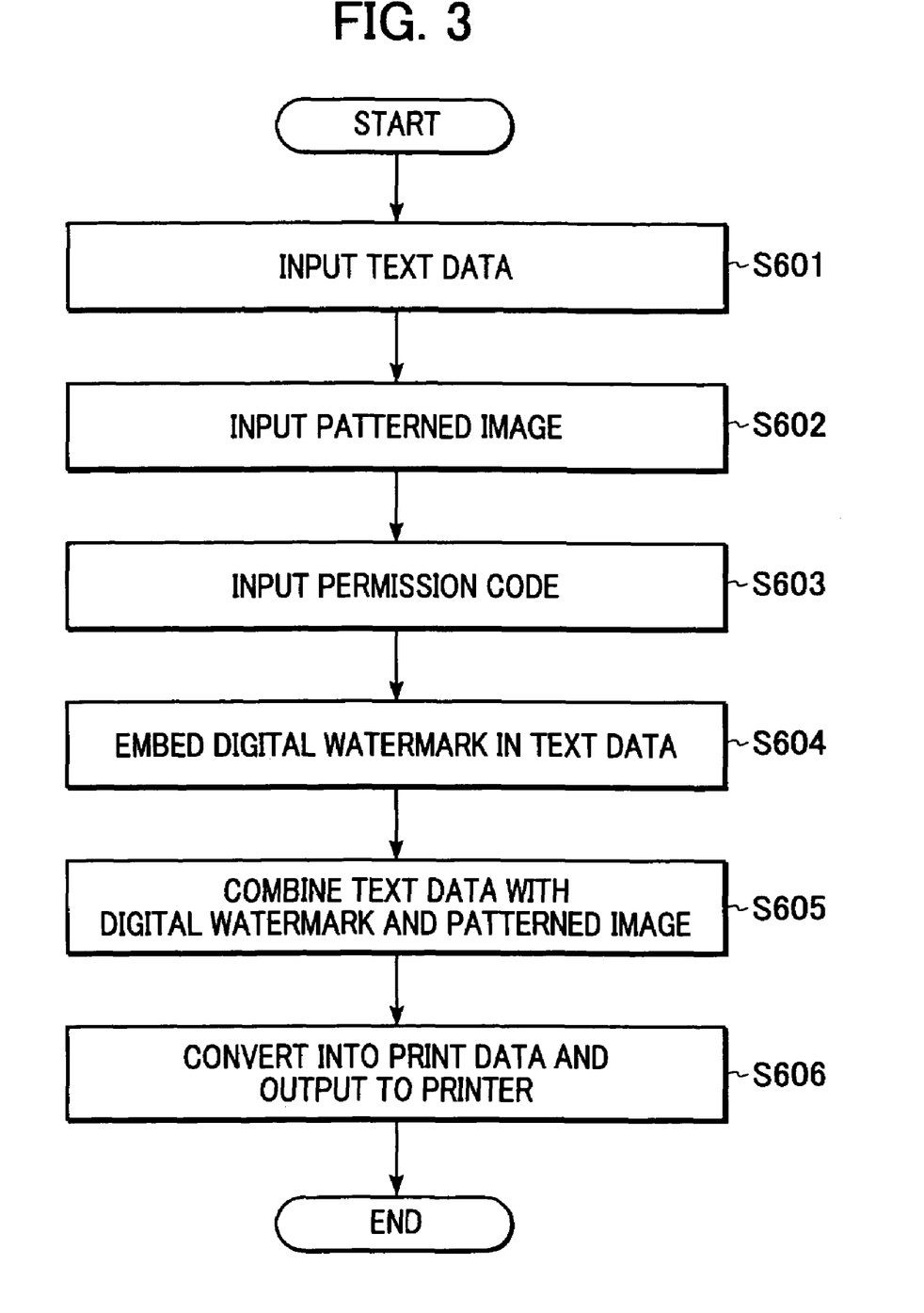
FIG. 3 is a flowchart describing the processes for executing individual software programs functioning as a CPU 501, a patterned image generator 101, a digital watermark embedding unit 102, a combiner 103, and a printing unit 104.

The process performed by the CPU 501 of a computer equipped with the above components when executing individual software programs that function as the patterned image generator 101, the digital watermark embedding unit 102, the combiner 103, and the printing unit 104 is described using the flowchart depicted in FIG. 3. A detailed description of each step of the process has been described above with respect to the discussion on FIG. 1. Therefore, the steps of FIG. 3 are briefly described below.

First, data for the digital document and the patterned image are loaded into the RAM 502 from the external memory 507 or the storage medium drive 508 (steps S601 and S602). Then a permission code, in the form of a digital watermark, may be inputted from the keyboard 504 or the mouse 505 (step S603). Steps S601 to S603 do not necessarily have to be executed in this order.

Next, the permission code inputted in step S603 is embedded as a digital watermark in the text data inputted in step S601 (step S604). Then the text data with an embedded digital watermark is combined with the patterned image loaded into the RAM 502 at step S602, and, as a result, a text image is generated (S605). The generated text image is converted into print data, and this print data is outputted to the printer 510 (step S606).

Through the above-described process, a text image, including a patterned image in the background and text with an embedded digital watermark, is stored on a storage medium by the printer 510.

In this embodiment, the text image generator included a computer and a printer, where each was treated as an individual apparatus. In another embodiment, the computer and printer may be treated as one unit.

In this embodiment, the keyboard 504 or the mouse 505 was used to input digital watermark data. The digital watermark data, however, may be inputted using other input devices, such as a touch panel, that would enable practice of the present invention.

Copier

Figure 4:
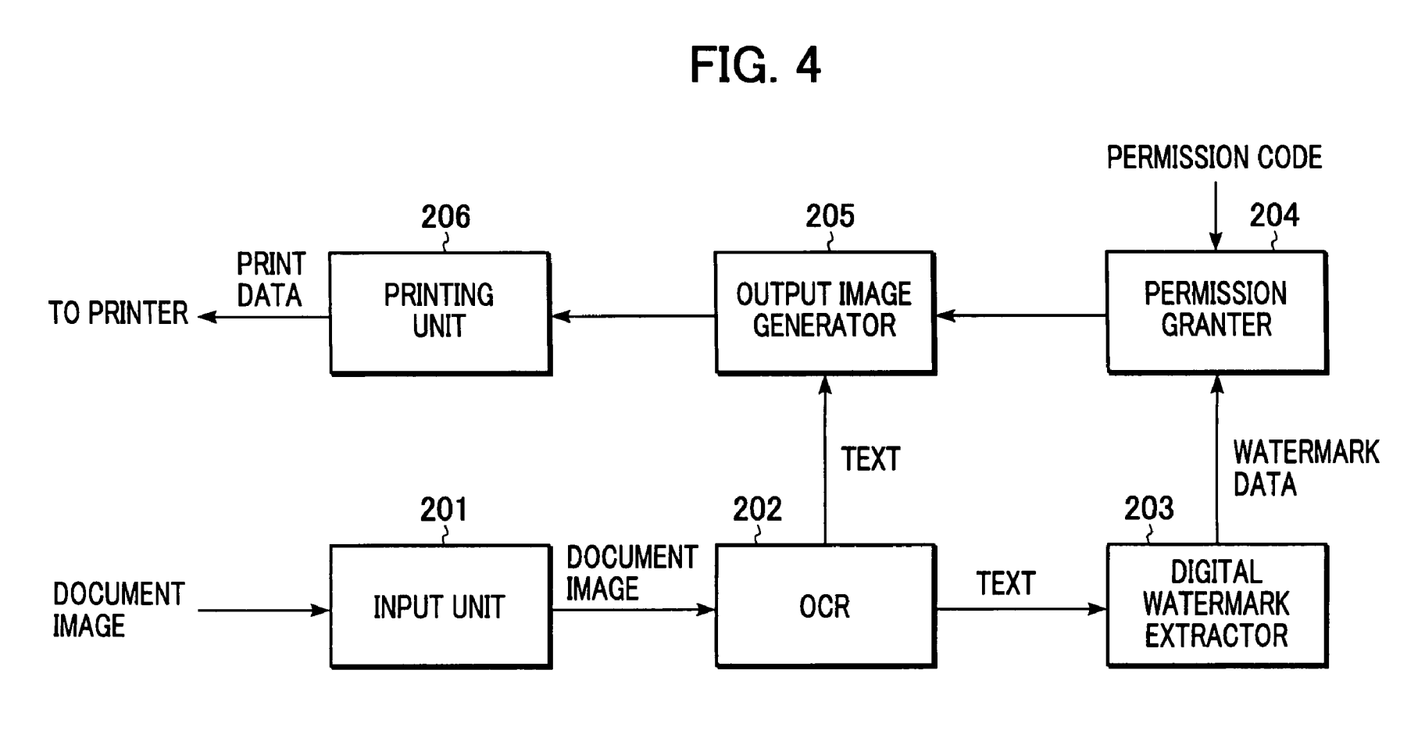
FIG. 4 is a block diagram showing the functional structure of a copier according to a second embodiment of the present invention.

FIG. 4 is a block diagram showing the functional structure of the above-mentioned copier. Each unit shown in the drawing is implemented by software. The function of each unit is realized by executing software programs corresponding to each unit with a CPU (or a main controller such as an MPU) included in a computer. The basic structure of the computer is described in the following.

An input unit 201 receives, from a scanner (not shown), the digital data of text and image stored on a recording medium outputted by the above-mentioned printer 510. Then, the input unit 201 outputs this data to an OCR 202. The OCR 202 applies known OCR technology to separate the digital data of the text image inputted from the input unit 201 into a background image (patterned image) and text (image including only text).

The separated text is sent to a digital watermark extractor 203. The digital watermark extractor 203 extracts the digital watermark data from the text, and then outputs the extracted digital watermark data to a permission granter 204. To extract the digital watermark, data, such as a key used for embedding the digital watermark, must be preliminarily shared between the extractor and the embedding unit.

The permission granter 204 decides whether the extracted digital watermark data, i.e. the permission code, is the same as the permission code inputted by the user. The permission code is the information required, such as a password, an identification number of the digital document, or credit card information for paying a user's fee, for granting permission for the user to perform a copy operation.

An output image generator 205 performs the next process in accordance with the results of the permission granter 204. The output image generator 205 generates the version of the image that is to be outputted. For example, if the extracted digital watermark includes a code for granting permission to copy the entire digital document, the output image generator 205 generates a new text image by combining a patterned image stored in advance, which is used for the background, and the text read by the OCR 202. The text image is then sent to a printing unit 206.

The printing unit 206 is, for example, a printer driver that converts the text image from the output image generator 205 into print data and sends this data to a printer. The printing unit is not limited to a printer driver, and any function that would enable practice of the present invention is applicable.

In this embodiment, the text image stored on a recording medium is read by a scanner (not shown). For reasons related to the reading resolution that are well known, the OCR 202 reads the digital data of the text image, including a clear latent image. The output image generator 205 generates the text image by combining a new patterned image and the text extracted by the OCR 202. As a result, the latent image included in the resulting printed output of the print data from the printing unit 206 is does not clearly appear.

By the above-described process, a text image that is almost identical to the text image data sent to the input unit 201 can be printed by the printer without making the latent image of the patterned image clearly appear on the printed image. In other words, a copy identical to the original may be produced by printing the text image sent to the input unit 201.

The text image stored on a recording medium outputted from the printer has a patterned image and text with an embedded digital watermark. Therefore, when this text image is copied with the above-mentioned copier, the latent image is clearly printed. As a result, the copied image differs from the original text image and sufficient security against copying the original is provided.

If the digital watermark extracted by the digital watermark extractor 203 includes a permission code for granting permission to copy a portion of the digital document, the output image generator 205 cuts out a portion from the new text image generated through the above-described process. This new text image is then sent to the printing unit 206. The portion to be cut out may be a portion assigned by the digital watermark or may be any portion of the text image.

If the digital watermark extracted by the digital watermark extractor 203 includes a code for prohibiting the production of a copy of the digital document, the output image generator 205 does not output anything and the printing unit 206 also does not operate. Alternatively, the output image generator 205 may generate an image, or readout the image if the image is already stored, indicating that copying is prohibited. This image is sent to the printing unit 206. The printing unit 206 generates print data according to this input and then sends the print data to a printer.

Figure 5:
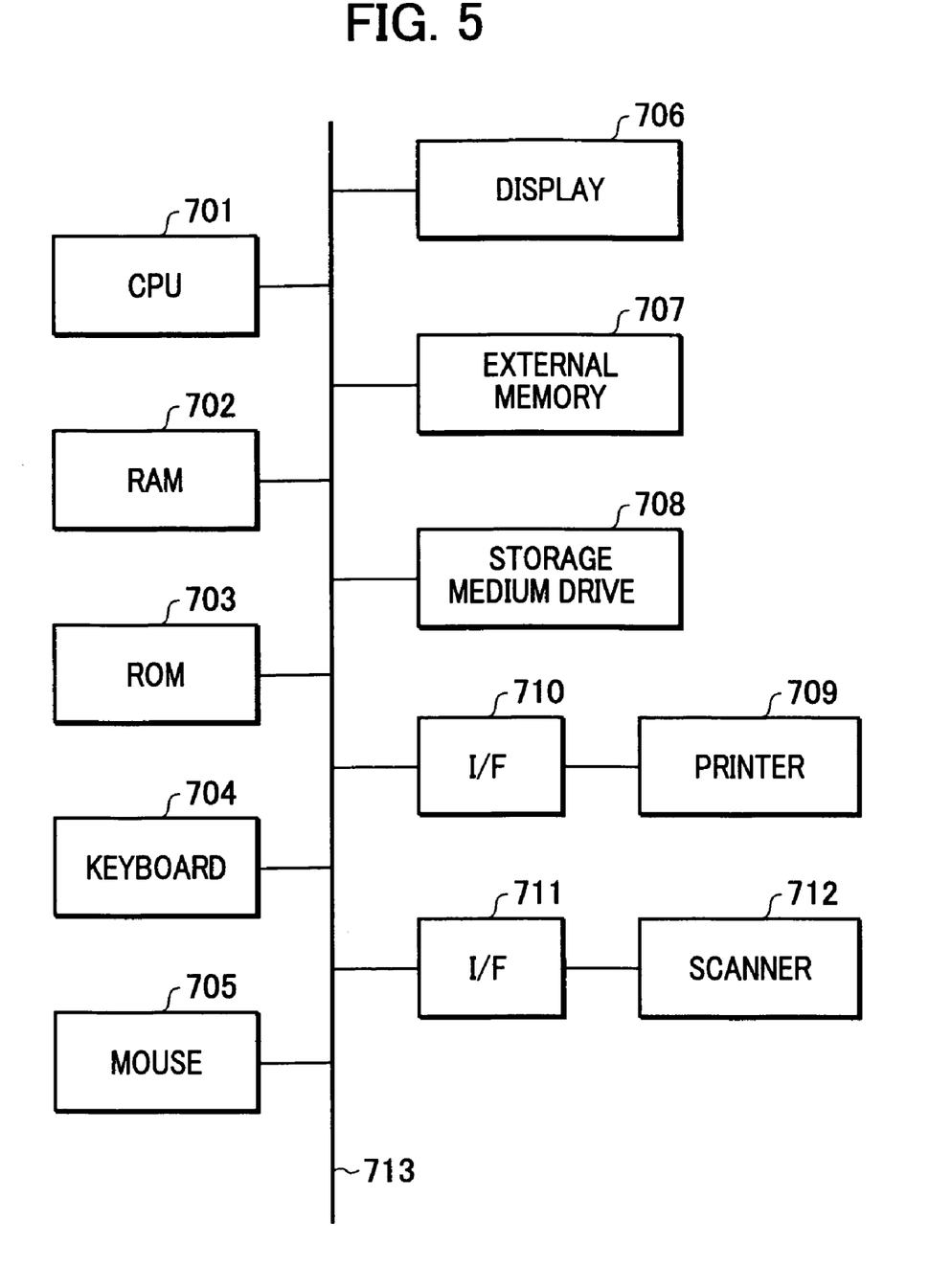
FIG. 5 shows the basic composition of a computer executing software programs corresponding to each unit, a printer, and a scanner, shown in FIG. 4.

FIG. 5 shows the basic structure of a computer for executing software programs corresponding to each unit shown in FIG. 4, and a printer (not shown) and a scanner (not shown) used in conjunction with the units of FIG. 4.

A CPU 701 controls the entire computer by utilizing programs and data stored in memories such as RAM 702 and ROM 703. At the same time, the CPU 701 controls the series of processes related to copying. The RAM 702 has an area for temporarily storing programs and data loaded from an external memory 707 or a storage medium drive 708. The RAM 702 also has an area required for the CPU 701 to execute various processes.

Generally, the ROM 703 stores programs and data for controlling the entire computer. A keyboard 704 and a mouse 705 are used for inputting various commands to the CPU 701. The users may input the permission code by using the keyboard 704 and the mouse 705.

A display 706 is composed of a CRT or a liquid display and displays the text image to be copied and a screen for inputting the permission code. An external memory 707 is typically a mass storage device such as a hard disk. The external memory 707 stores an operating system (OS) and individual software programs that function as the input unit 201, the OCR 202, the digital watermark extractor unit 203, the permission granter 204, the output image generator 205, and the printing unit 206. When the patterned image is prepared in advance, this is stored in the external memory 707 and used. When an image for indicating that copying is prohibited is prepared in advance, this is also stored in the external memory 707.

A storage medium drive 708 reads programs and data stored on a storage medium such as a CD-ROM or a DVD-ROM and sends the programs and data to the RAM 702 or the external memory 707. Alternatively, the programs and data stored in the external memory 707 may be partly or entirely stored on a storage medium and may be loaded into the RAM 702 as required.

The computer performs data communication with a printer 709 via an interface (I/F) 710. A printer 709 is an apparatus for forming images on a recording medium, such as paper or overhead projector (OHP) films, in accordance with the print data generated by the above-described printing unit 206.

The computer performs data communication with a scanner 712 via an interface (I/F) 711. The scanner 712 reads the text image stored on a recording medium outputted from the above-described printer 709. The scanner 712 then sends the digital data of the text image to the input unit 201. A bus 713 connects the above-mentioned units.

The process performed by the CPU 701 of a computer equipped with the above-mentioned components executes individual software programs that function as the input unit 201, the OCR 202, the digital watermark extractor unit 203, the permission granter 204, the output image generator 205, and the printing unit 206. The process for executing these programs is described using the flowchart depicted in FIG. 6. A detailed description of each step of the process has been provided above with respect to the discussion of FIG. 5. Therefore, the steps are briefly described below.

Figure 6:
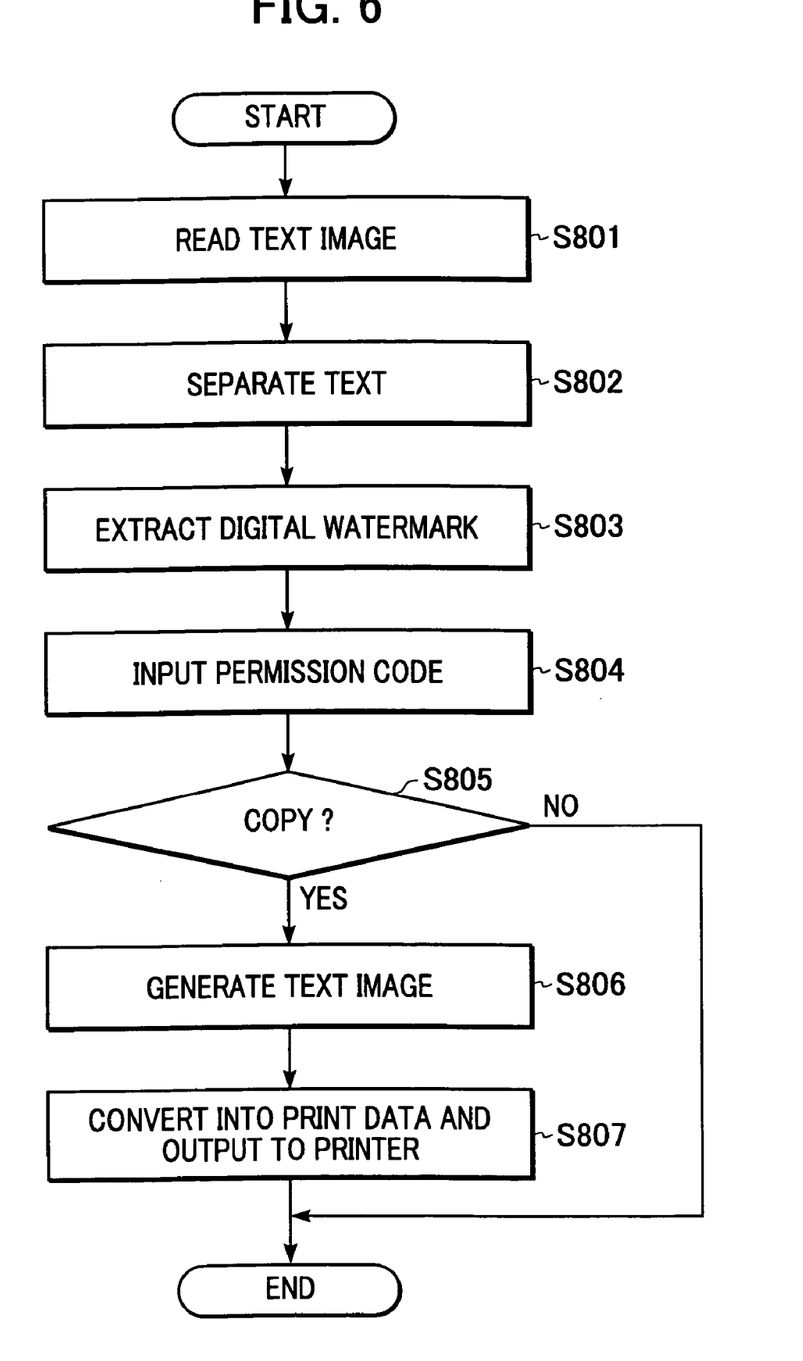
FIG. 6 is a flowchart describing the processes for executing individual software programs functioning as a CPU 701, an input unit 201, an OCR 202, a digital watermark extractor 203, a permission granter 204, an output image generator 205, and a printing unit 206.

The digital data of the text image read by the scanner 712 is sent to the RAM 502 by the input unit 201 (step S801). Then, text is separated from the text image (step S802), and the digital watermark is extracted from the separated text (step S803). The extracted digital watermark is stored in the RAM 502.

Next, the permission granter 204 receives a permission code inputted by the user (step S804). Then, the permission code included in the digital watermark extracted in step S803 and stored in the RAM 502 is compared with the inputted permission code, and it is determined whether or not the two codes match each other (step S805). In other words, this is a process for determining whether or not permission for copying should be granted.

When permission is granted, the text image is combined with the patterned image, which is used for the background and stored in the external memory 507 in advance or newly prepared, to generate a new text image. The new text image is then converted into print data and sent to the printing unit 709. When permission is not granted, the process terminates.

Through the process described above, an authorized user (i.e., granted permission) can produce a copy of the text image. The copy of the text image is a combination of the patterned image, which is the background image, and text, which has an embedded digital watermark, and is produced without making the latent image appear clearly.

In the above embodiment, the digital watermark included a permission code for granting permission to copy a portion of the digital document. The permission, however, does not have to be limited to a portion of the digital document. Instead, if the permission code, which is the extracted digital watermark data, matches the permission code inputted by the user, the permission may be granted for copying the entire document. If the two permission codes do not match, copying is prohibited.

Depending on the setting of the digital watermark and the permission code, the conditions for copying the document may be precisely regulated. For example, information on the number of times copying is permitted may be included in the digital watermark. Thus, the digital watermark can be changed each time the document is copied to regulate the number of times the document may be copied.

Figure 7:
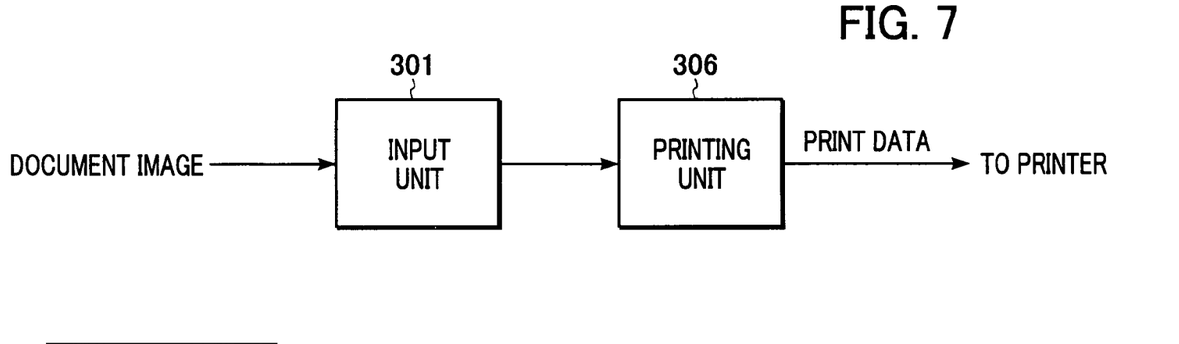
FIG. 7 is a block diagram showing the functional structure of a known copier.

For comparison, the process of copying a text image generated by the above-described text image generator recorded on a recording medium outputted by the printing unit 709 is described in the following. FIG. 7 is a block diagram showing the functional structure of a known copier.

As described above, when the recording medium outputted from the printing unit 709 is sent to the input unit 301, the digital data of a text image with a clear latent image will be sent to the printing unit 306 due to reasons related to the reading resolution of the scanner 712 that are well-known. Since the printing unit generates print data for the text image with a clear latent image, as a result, a text image with a clear latent image will be recorded on a recording medium.

In this embodiment, the text image generator includes three separate components, i.e. the computer, the printing unit, and the scanner. In another embodiment, all three components may be integrated into a single unit.

Furthermore, in this embodiment, the keyboard 704 and the mouse 705 were used for inputting the digital watermark data. The input unit is not limited to this, however, and other input units, such as a touch panel, that would enable practice of the present invention are applicable.

In this embodiment, a digital watermark for text was described through the process of combining text data and a patterned image. This embodiment may also be applied to a combination of graphics and a patterned image. In such a case, a digital watermark applicable to graphics (e.g., a digital watermark for a static image or for a binary image) should be used.

Second Embodiment

Figure 8:
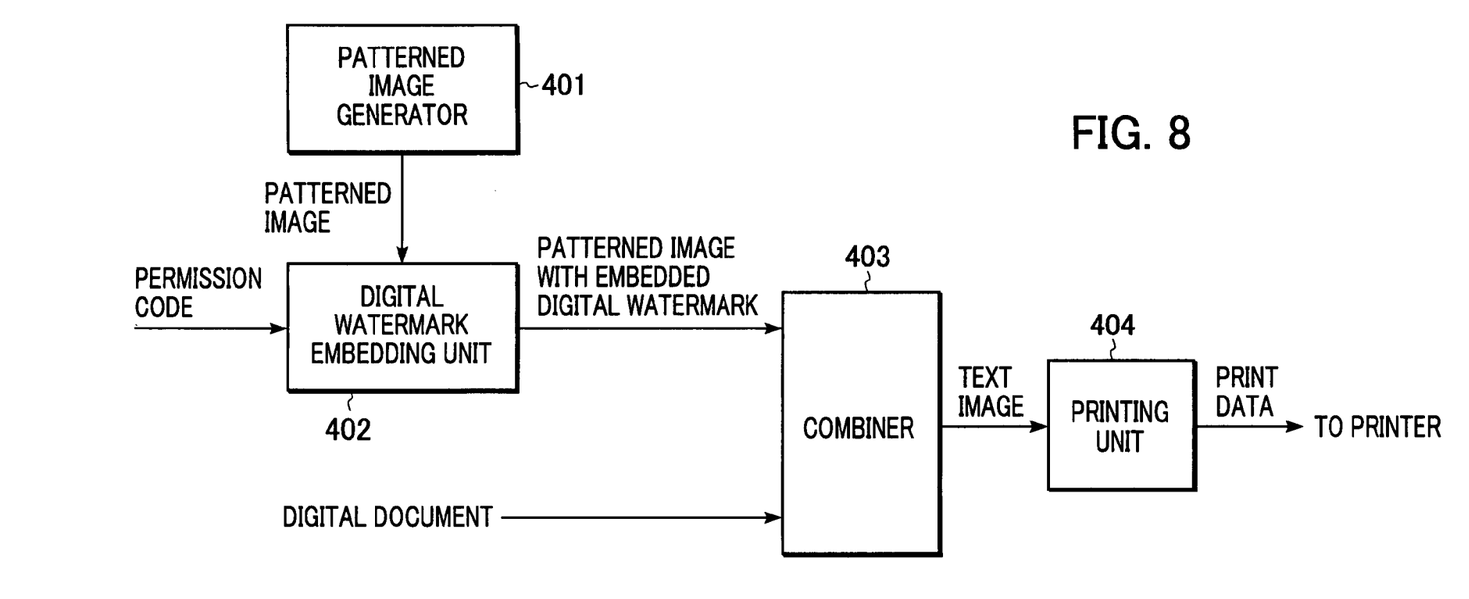
FIG. 8 is a block diagram showing the functional structure of a text image generator according to a second embodiment of the present invention.

In the first embodiment, a digital watermark was embedded in text. The digital watermark, however, may also be embedding in a patterned image. A digital watermark is embedded in a patterned image by manipulating the pattern (e.g., the interval between dots) of the patterned image. In this way, a watermark may be inserted in a latent image that appears when the document is copied. FIG. 8 is a block diagram showing the functional structure of this type of text image generator. Each unit shown in FIG. 8 is implemented by software. The function of each unit shown in FIG. 8 is realized by executing software programs corresponding to each unit with a CPU 501 included in a computer.

A patterned image generator 401 is similar to the patterned image generator 101 of FIG. 1, and generates patterned images including latent images such as VOID patterns unperceivable by the human eye. The patterned image may be prepared in advance. In such case, the patterned image generator 401 will not generate a patterned image, but instead, function to supply the patterned image prepared in advance to the digital watermark embedding unit 402.

The digital watermark embedding unit 402 embeds a permission code as a digital watermark in a patterned image by manipulating the pattern of the patterned image to embed a permission code for copying a digital document. For example, to embed particular pieces of information, e.g. '0' or '1,' in a dot composing the patterned image, the dot can be displaced in one direction to indicate '0' and displaced in a different direction to indicate '1.'

The embedded permission code for this embodiment is the same as the first embodiment. The permission code is predetermined and inputted by the author of the digital document.

A combiner 403 combines the background patterned image having an embedded digital watermark generated by the digital watermark embedding unit 402 and the inputted text data to form a text image. The text image is sent to a printing unit 404.

The printing unit 404 is, for example, a printer driver that converts the text image from the combiner 403 into print data and sends this data to a printer.

The functional structure of a copier according to this embodiment is identical to the structure depicted in FIG. 4, except that in the present embodiment, the OCR 202 sends the separated patterned image to the digital watermark extractor 203, instead of sending the text. In the separated patterned image, a digital watermark is embedded in the pattern (the interval between dots) of the patterned image instead of the intensity of the latent image. The digital watermark is extracted at the digital watermark extractor 203. As was the case in the first embodiment, each unit of the present embodiment is implemented by software. The function of each unit is realized by executing software programs corresponding to each unit with a CPU 701 included in the computer shown in FIG. 5.

If an image is included in the digital document, the permission code may be imbedded in the image by employing a digital watermark for an image, instead of a digital watermark for text. Furthermore, if the digital document includes only an image, the digital watermark for an image may be used.

In the first embodiment, when permission for copying is granted, the copier copies the text image recorded on a recording medium outputted by the printer 510. In the present embodiment, when the text image generator receives a permission code such as a password assigned to a particular user, e.g. the author of the digital document, the original digital document without a patterned image and/or a digital watermark may be printed.

Another Embodiment

The object of the present invention is accomplished by supplying a recording medium (or a storage medium), which records software program code for implementing the functions according to the above-described embodiments, to a system or a unit. The object is also accomplished by a computer (CPU or MPU) of the system or the unit reading and executing program codes stored on a recording medium. In such case, the program code readout from the recording medium implements the function of the above-described embodiments. In other words, the recording medium recording the program codes comprises the present invention.

In this embodiment, by executing the program codes readout by the computer the functions of the above-described embodiments are implemented. The functions are also implemented by the operating system (OS) of the computer by partly or entirely executing the actual processing according to the commands in the program code.

Furthermore, after the program code readout from the recording medium is written into the memory included in a peripheral unit connected to a computer or an expansion card inserted into the computer, a CPU included in the expansion card or peripheral unit partly or entirely executes the actual processing. The processing by the computer implements the functions of this embodiment.

When the present invention is applied to the above-described recording medium, program code corresponding to the above-described flowcharts is stored in the recording medium.

In conclusion, the present invention enables the production of a copied text image, which is exactly copied from the original document, only by a user who has been granted permission to produce copies.

In other words, the foregoing descriptions of embodiments has been given for illustrative purposes only and are not to be construed as imposing any limitation in any respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processor comprising:
a scanning unit for reading a recording medium, the recording medium having first patterned image data printed thereon and image data printed thereon, the image data including embedded information, the first patterned image data including a latent image unperceivable by human eyes, the latent image being formed more clearly on a copy-destination recording medium when information recorded on the recording medium is copied by a copying machine;
a separating unit for separating the read image data input by the scanning unit to obtain the image data including the embedded information; and
an outputting unit for controlling output of combined image data produced by combining second patterned image data with the image data including the embedded information, the second patterned image data including a latent image unperceivable by human eyes, the latent image being formed more clearly on the copy-destination recording medium when information recorded on the recording medium is copied by the copying machine.

2. The image processor according to claim 1,
wherein the outputting unit includes an extracting unit for extracting the embedded information from the image data obtained by the separating unit, with the embedded information embedded therein,
wherein the outputting unit outputs the combined image data when the embedded information extracted by the extracting unit includes information indicating permission for copying the whole read image data,
wherein the outputting unit cuts out and outputs a part of the combined image data when the embedded information extracted by the extracting unit includes information indicating permission for copying a part of the read image data, and
wherein the outputting unit does not output the combined image data when the embedded information extracted by the extracting unit includes information indicating prohibition of copying.

3. The image processor according to claim 1, wherein the second patterned image data is patterned image data that is stored in advance or that is newly generated.

4. The image processor according to claim 1,
wherein the separating unit, by separating the read image data, also obtains the first patterned image data including the latent image appearing clearly in addition to the image data including information, and
wherein the outputting unit combines the second patterned image data, instead of the patterned image data with the latent image appearing clearly, with the image data with the embedded information embedded therein, and controls output of the combined image data obtained by the combining operation.

5. An image processing method comprising:

a scanning step of reading a recording medium, the recording medium having first patterned image data printed thereon and image data with embedded information embedded therein, the first patterned image data including a latent image unperceivable by human eyes, the latent image being formed more clearly on a copy-destination recording medium when information recorded on the recording medium is copied by a copying machine;

a separating step of separating the read image data read in the scanning step to obtain the image data with the embedded information embedded therein; and an outputting step of controlling output of combined image data produced by combining second patterned image data with the image data with the embedded information embedded therein, the second patterned image data including a latent image unperceivable by human eyes, the latent image being formed more clearly on the copy-destination recording medium when information recorded on the recording medium is copied by a copying machine.

6. The image processing method according to claim 5, wherein the outputting step includes an extracting step of extracting the embedded information from the image data, obtained in the separating step, including the embedded information, wherein, in the outputting step, the combined image data is output when the embedded information extracted in the extracting step includes information indicating permission for copying the whole read image data, wherein, in the outputting step, a part of the combined image data is cut out and output when the embedded information extracted in the extracting step includes information indicating permission for copying a part of the read image data, and wherein, in the outputting step, the combined image data is not output when the embedded information extracted in the extracting step includes information indicating prohibition of copying.

7. The image processing method according to claim 5, wherein the second patterned image data is patterned image data that was stored in advance or that is newly generated.

8. The image processing method according to claim 5, wherein, by separating the read image data in the separating step, the patterned image data including the latent image appearing clearly is also obtained in addition to the image data including the embedded information, and wherein, in the outputting step, the second patterned image data, instead of the patterned image data including the latent image appearing clearly, is combined with the image data including the embedded information, and an output of the combined image data obtained by the combining operation is controlled.

* * * * *